(12) United States Patent
Jansen et al.

(10) Patent No.: US 10,086,922 B2
(45) Date of Patent: Oct. 2, 2018

(54) LOW STRESS STIFFENER RUNOUT IN PI BONDED STRUCTURE

(71) Applicant: The Boeing Company, Chicago, IL (US)

(72) Inventors: Jan T. Jansen, Florissant, MO (US); Ryan Stott, Cedar Hill, MO (US); William Vallellanes, St. Louis, MO (US); Jack Van Es, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 14/099,048

(22) Filed: Dec. 6, 2013

(65) Prior Publication Data
US 2016/0009355 A1    Jan. 14, 2016

Related U.S. Application Data

(60) Provisional application No. 61/904,927, filed on Nov. 15, 2013.

(51) Int. Cl.
| B64C 1/06 | (2006.01) |
| B64C 3/18 | (2006.01) |
| B63B 3/00 | (2006.01) |
| B64G 1/22 | (2006.01) |

(52) U.S. Cl.
CPC ............... B64C 1/064 (2013.01); B63B 3/00 (2013.01); B64C 3/182 (2013.01); B64G 1/22 (2013.01)

(58) Field of Classification Search
USPC ... 244/136, 131, 123.1, 123.7, 123.8, 123.9, 244/124
See application file for complete search history.

(56) References Cited

U.S. PATENT DOCUMENTS

| 2,709,973 | A | * | 6/1955 | Meyer | ................ B61D 17/08 |
| | | | | | 105/401 |
| 3,339,333 | A | * | 9/1967 | Kovalcik | ............ E04F 13/0864 |
| | | | | | 29/412 |
| 5,273,806 | A | | 12/1993 | Lochshaw et al. | |
| 6,415,496 | B1 | * | 7/2002 | Dominguez Casado | ................ |
| | | | | | B64C 1/06 |
| | | | | | 244/131 |

(Continued)

FOREIGN PATENT DOCUMENTS

| WO | WO 2011/0003844 | 1/2011 |
| WO | WO 2012/042246 | 4/2012 |

OTHER PUBLICATIONS

International Search Report and Written Opinion dated Nov. 11, 2014 from PCT Application Serial No. PCT/US2014/048422.

(Continued)

*Primary Examiner* — Theodore V Adamos
(74) *Attorney, Agent, or Firm* — Miller, Matthias & Hull LLP (57) ABSTRACT

A stringer for having a runout with a raised area configured to reduces stress while improving drainage across the runout when utilized in a close structural component of a vehicle such as an aileron of an aircraft. In one or more configurations, the raised area of the runout of the stringer includes multiple tapered surfaces adjacent to one another oriented and configured as ramps to collectively guide water up, over and down the raised area of the stringer.

9 Claims, 5 Drawing Sheets

(56) References Cited

U.S. PATENT DOCUMENTS

| | | | |
|---|---|---|---|
| 8,628,717 B2* | 1/2014 | Pook | B29C 70/443 264/510 |
| 8,636,252 B2* | 1/2014 | Pook | B29C 65/5057 244/119 |
| 9,440,402 B2* | 9/2016 | Pook | B29C 70/48 |
| 2005/0211846 A1* | 9/2005 | Leon-Dufour | B64C 1/12 244/126 |
| 2009/0200425 A1* | 8/2009 | Kallinen | B64C 1/26 244/131 |
| 2010/0127122 A1 | 5/2010 | Consentino | |
| 2011/0174927 A1 | 7/2011 | Outon Hernandez et al. | |
| 2011/0315824 A1* | 12/2011 | Pook | B29C 70/443 244/133 |
| 2013/0089712 A1 | 4/2013 | Kwon et al. | |
| 2013/0101801 A1 | 4/2013 | Ruiz et al. | |
| 2013/0164489 A1 | 6/2013 | Gaitonde et al. | |
| 2013/0209746 A1 | 8/2013 | Reighley et al. | |

OTHER PUBLICATIONS

Chinese Office Action for Related Patent Application No. 201480061726.4; Report dated Dec. 8, 2017.

* cited by examiner

LOW STRESS STIFFENER RUNOUT IN PI BONDED STRUCTURE

CROSS-REFERENCE TO RELATED APPLICATIONS

This application claims the benefit of U.S. Provisional Patent Application No. 61/904,927 filed on Nov. 15, 2013, and entitled "LOW STRESS STIFFENER RUNOUT IN PI BONDED STRUCTURE," which is expressly incorporated herein by reference in its entirety.

STATEMENT OF GOVERNMENT INTEREST

This invention was made with Government support under Contract Number F33657-D-0026 awarded under the U.S. Air Force. The government has certain rights in this invention.

TECHNICAL FIELD

The field of the embodiments presented herein is directed toward discontinuous stringers in aircraft skins having high stresses, and more particularly, to configuring stringer runouts to reduces stresses while also providing for water drainage across the stringer runouts.

BACKGROUND

Vehicle lifespan may be increased by reducing stress loads upon structural components of the vehicle. The structural components often use stiffened panels and other structures bonded with ribs and stringers (stiffeners) to prevent the panel from buckling or otherwise failing when subjected to compressive loads. While stringers provide adequate reinforcement with respect to compressive loads, the stringer runouts, or areas at which the stringers terminate and interface with ribs, may experience premature failure due to local stress concentrations under certain conditions.

Traditionally, stringers utilize the runouts to terminate the stringers due to conflict with other structural components such as the ribs and the runouts inherently form local stress concentrations which reduce the useful life of the panel. Various techniques are used to reduce the local stress concentrations. But increasing skin and stringer thickness contributes to undesirable increases in cost and weight of the corresponding panel. Also, increased stiffness typically induces increased loads which may lead to premature failures.

Figure 1:
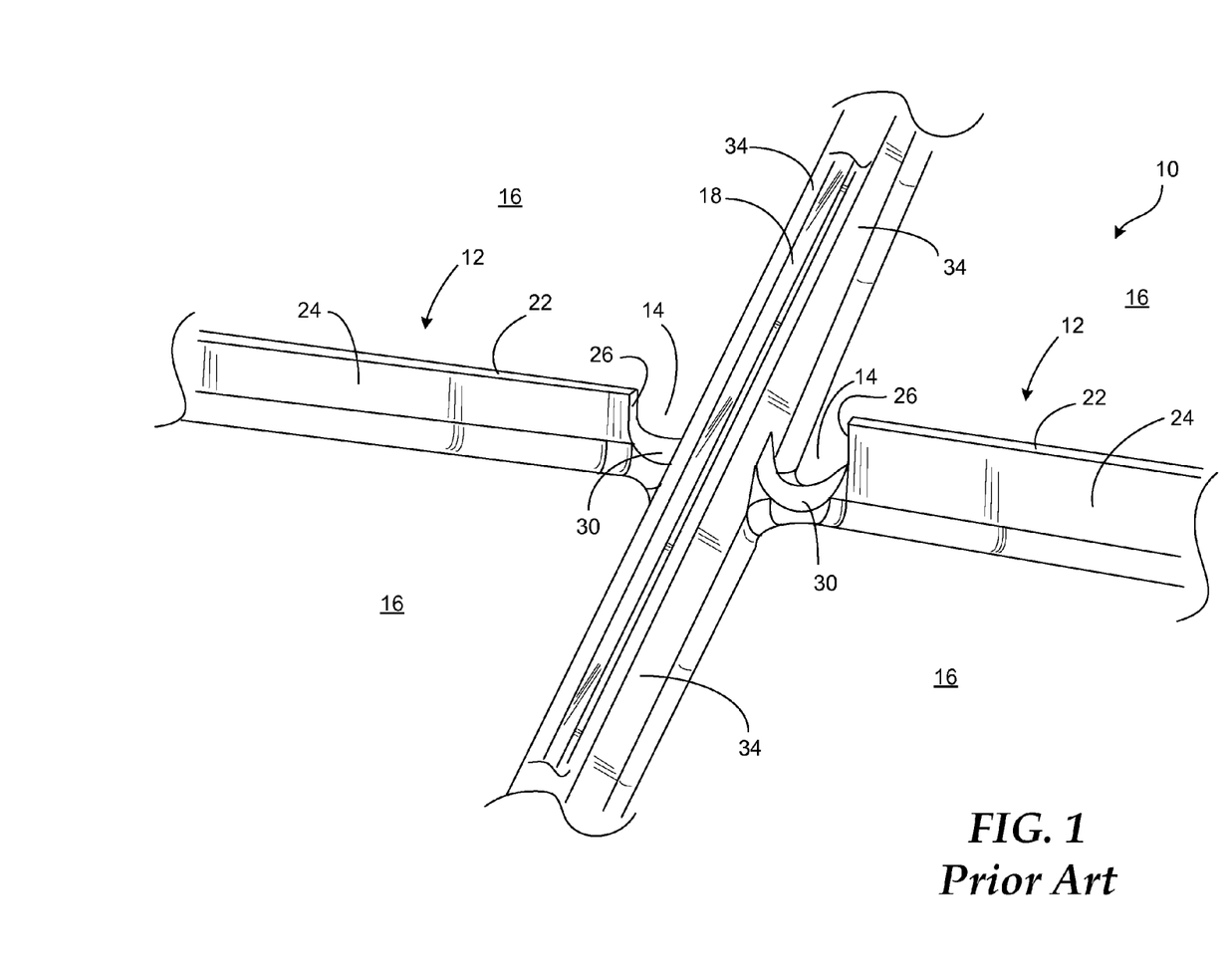
FIG. 1 illustrates a perspective view of integrally machined skin and discontinuous stringers having a U-shaped cutout in a Pi bonded rib structure for forming a structural component.

Water may collect within the closed periphery of the interior of an assembled structural component. For example, in a vehicle such as an aircraft, water collects between joined upper and lower surfaces of a portion of a wing or a control surface such as flap, aileron, or elevator. A portion of a stringer enclosed within the structural component may be configured to permit water drainage across the stringer from one side to the other. For example, as shown in FIG. 1, a U-shaped cutout or opening may be machined into the web of the stringer that is big enough to create a water drain path and permit sufficient water drainage within the closed interior of the structural component.

Although the U-shaped cutout is needed for water drainage, the U-shaped cutout increases local stresses of the panel. Under flight conditions the current configuration of the U-shaped cutout creates a stress concentration that leads to premature failure of the closed structural component. Although a U-shaped cutout with a larger radius or curvature will reduce peak stress concentrations, the resulting reduced stresses will still result in earlier fatigue failure. Also, if a U-shaped cutout with a larger radius were machined into the stringer to reduce the stress concentrations enough to reduce premature failures, the radius of the enlarged U-shaped cutout would be larger than the height of the web of the stringer which is impractical.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a first stringer is provided. The first stringer includes a web having a web height and a runout at a distal end of the web. The runout is defined at least by a raised area extending beyond the distal end of the web and a tapered distal edge of the web continuing into the raised area as the web height decreases. Opposite sides of the raised area each include an inverse taper such that the raised area widens substantially perpendicular to the web as the web tapers into the raised area and as the raised area extends beyond the distal end of the web. The raised area may include multiple tapered surfaces adjacent to one another oriented and configured as ramps to collectively guide water over the raised area. The tapered distal edge of the web may terminate into the raised area or continue into a transverse raised portion of the skin of the structural component.

According to another embodiment disclosed herein, a stringer assembly is provided. The stringer assembly includes a transverse rib and a first stringer with a web having a web height and a runout at a distal end of the web. The runout is defined at least by a raised area extending beyond the distal end of the web and a tapered distal edge of the web continuing into the raised area as the web height decreases. Opposite sides of the raised area each include an inverse taper such that the raised area widens substantially perpidicularly to the web as the web tapers into the raised area and as the raised area extends beyond the distal end of the web. The stringer assembly also includes a second stringer longitudinally aligned with the first stringer. The second string includes a web having a web height and a runout at a distal end of the web. The runout is defined at least by a raised area extending beyond the distal end of the web and a tapered distal edge of the web continuing into the raised area as the web height decreases. Opposite sides of the raised area each include an inverse taper such that the raised area widens substantially perpidicularly to the web as the web tapers into the raised area and as the raised area extends beyond the distal end of the web. The raised areas of the first and second stringers continue into transverse raised portions of the skin bonded to the transverse rib and the distal ends of the first and second stringers are bisected by the transverse rib.

According to yet another embodiment disclosed herein, a method of reducing stress loads and controlling the drainage of water around a stringer is provided. The method includes providing a stringer with a web having a web height and a runout at a distal end of the web and a raised area extending longitudinally and laterally beyond the distal end of the web. The method also includes tapering a distal edge of the web and continuing the distal edge into the raised area as the web height decreases and inverse tapering opposite sides of the raised area such that the raised area widens substantially perpendicularly to the web as the distal edge continues into the raised area and as the raised area extends beyond the distal end of the web. The method may also include guiding water over the raised area of the stringer wherein the raised area provides multiple tapered surfaces adjacent to one another and orienting the tapered surface as ramps to collectively guide the water over the raised area.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to increasing the lifespan of integrally stiffened structures by reducing peak stresses without significantly increasing component stiffness or weight. As discussed above, premature failure of the structural components may occur at stringer runout locations when subjected to operational loads. Solutions to the premature failure of the stringers due to local stress concentrations should contemplate weight factors, as well as cost and complexity of manufacturing, particularly within the aircraft industry.

Aspects of this disclosure may be used in many types of vehicles such as, for example, aircraft, spacecraft, satellites, watercraft, submarines, and passenger, agricultural or construction vehicles. For the sake of simplicity in explaining aspects of the present disclosure, this specification may utilize an aircraft as the primary example. The one or more embodiments described below will be described within the context of integral structural components for aircraft where the stringers and skin (panel) are manufactured from one solid block of material and where the stringers are discontinuous stringers bisected by a continuous transverse rib for forming a Pi bonded and closed structural component. It should be appreciated that the various embodiments are not limited to these specific components, or to use within vehicles such as aircraft. Rather, the concepts described below may equally apply to any implementation in which a stringer or similar stiffening component is terminated in a structural component. In the following detailed description, references are made to the accompanying drawings that form a part hereof and in which are shown by way of illustration specific embodiments or examples. Referring now to the drawings, in which like numerals represent like elements throughout the several figures, aspects of the present disclosure will be presented.

In one or more configurations, a milling machine integrally forms the skin with the stringers of one side of the structural component from a single workpiece. The inside surface of the skin is milled with transverse raised portions that are continuous and outwardly protrude from the inside surface of the skin. The top of each transverse raised portion includes a continuous groove or slot configured to receive a lengthwise edge a rib. The rib is a separate flat metallic component bonded into the groove of the skin which requires that the stringers be discontinuous. A second side of the structural component may be similarly milled from a second workpiece. Two opposing sides of the structural component are then bonded together by placing the ribs between the two opposing sides and within the grooves in a tongue and groove fashion. This closed metallic structural component is sometimes referred to as a grid lock assembly or, alternatively, as a Pi bonded structure because the end view of each transverse raised portion with a groove protruding from the skin appears to depict the symbol "π" commonly Romanized as "Pi."

The structural component may be used, for example, as part of the skin of the aircraft. The skin may form part of an aircraft fuselage or wing such as an aileron. In the case of an aircraft wing, the stringers typically run in a span-wise direction from the root of the wing toward its tip. In aircraft construction, a stringer, stiffener or longeron is a thin strip of material, to which the skin of the aircraft may be secured, or is integrally formed with the skin, and sometimes these terms may be used interchangeably.

For the sake of simplicity in explaining aspects of the present disclosure, this specification will proceed utilizing Pi bonded structures 50, 110 including stringers 52, 112, with runouts 66, 126 having raised areas 70, 130 as the primary examples as described in greater detail below. Throughout the disclosure, a reference to an element with double reference numbers such as stringers 52, 112 may refer to either one or both of the stringer 52 and stringer 112. Also, other elements with double reference numbers within the disclosure such as the runouts 66, 126 and the raised areas 70, 130, for example, may refer to either one or both.

Many of aspects of the present disclosure are not limited to the Pi bonded structures 50, 110. The combination of the stringers 52, 112 and the raised areas 70, 130 may be tailored to have structural stiffness optimized for low stresses. Dependent on the thickness of the skin 54, 114, the size of the stringers 52, 112 and the spacing between adjacent stringers 52, 112, the configuration of the raised areas 70, 130 may be tailored to achieve a stress level which results in the desired fatigue life for the component. Use of the stringers 52, 112 with the raised areas 70, 130 increases the lifespan of the integrally stiffened assembly of the structural component by reducing the peak stresses without significantly increasing component stiffness or weight. For every 10% the peak stress is reduced the structural component's flight hours before failure is doubled.

FIG. 1 illustrates a perspective view of integrally machined skin 16 with discontinuous stringers 12 of a known Pi bonded structure 10 with U-shaped cutouts 14 at the ends of the two longitudinally aligned stringers 12 for relieving local stress concentrations and for providing water drainage at the interface with the rib 18. Each stringer 12 includes a top edge 22 running along the longitudinal length of the stringers 12. The distal end of each web 24 of the stringers 12 includes a substantially straight and vertical end portion 26 that extends down from the top edge 22 of each stringer 12 and at least to a midpoint along the height of the distal end of each web 24. The U-shaped cutouts 14 are substantially curved or rounded at the bottom in proximity of the skin 16. Below the midpoint of the height of each web 24, the U-shaped cutout 14 begins to curve and may be defined by an arc or segment 30 of a circle such as a semicircle. The portion of the U-shaped cutout 14 opposite the vertical end portion 26 of each stringer 12 continues into the transverse raised portion 34 of the skin 16. The rib 18 is bonded into the groove of the transverse raised portion 34.

The dimensions of the U-shaped cutouts 14 are limited to a single pass and the radius of the ball-end cutter of the milling machine. The width of the segment 30 at the bottom of the U-shaped cutout 14 extends longitudinally from the web 24 and is generally narrow and substantially less that the height of the web 24 of the stringer 12. For example, the width of the segment 30 longitudinally is generally less than half the height of the web 24 of the stringer 12. The width of the segment 30 is also less than the vertical end portion 26 of the distal end of the web 24 of the stringer 12.

Figure 2:
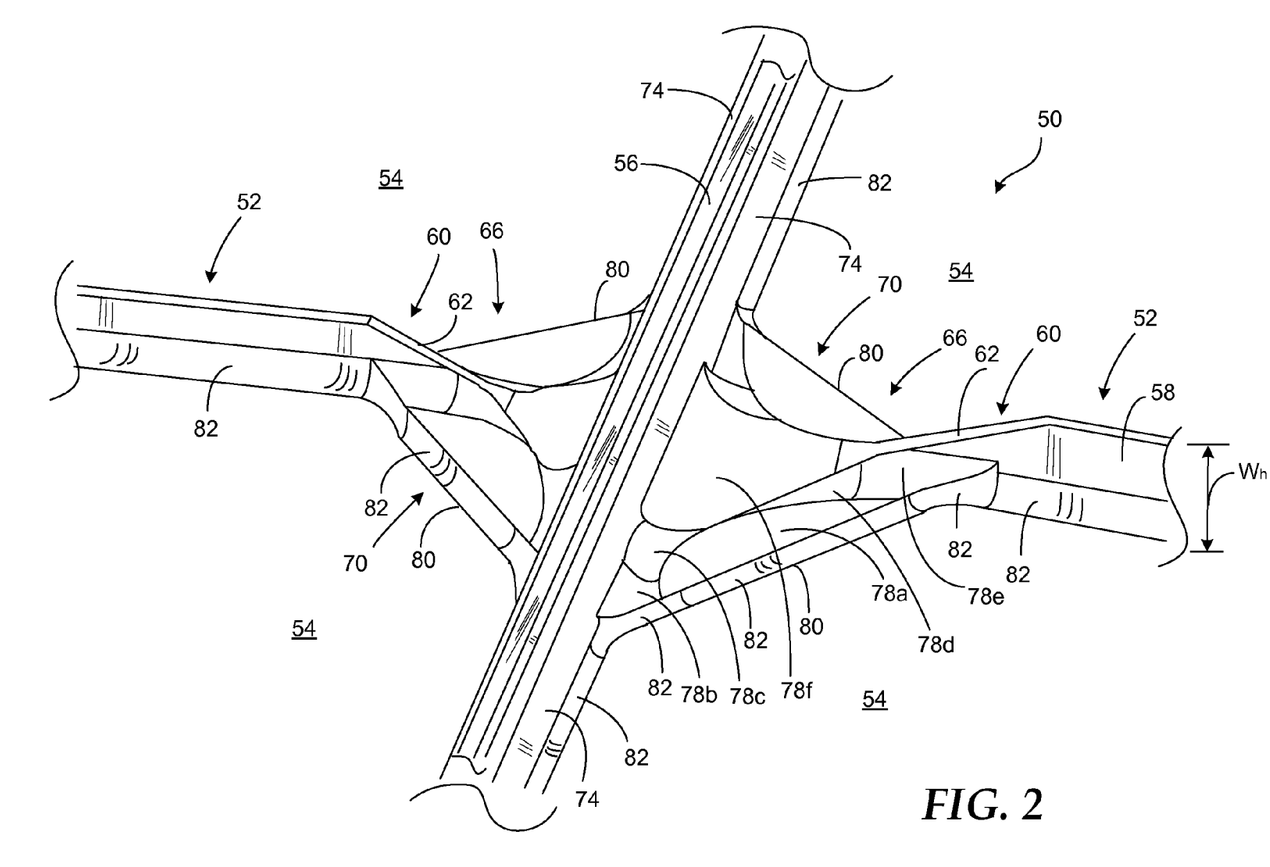
FIG. 2 illustrates a perspective view of one configuration of integrated skin and stringers with tapered ends bisected by a continuous transverse stiffener (rib) in a Pi bonded structure wherein each of the tapered ends include a raised area continuing into the structure of the skin bonded to the rib, which is used in association with at least one embodiment disclosed herein.

FIG. 2 illustrates a perspective view of the Pi bonded structure 50 of an integrally machined skin 54 having discontinuous first and second stringers 52 with tapered ends bisected by a transverse rib 56 according to one or more configurations of the present disclosure. The first and second stringers 52 are substantially longitudinally aligned end-to-end with one another and are integral with the skin 54. The rib 56 is continuous and transverse relative to the stringers 52 such that the first and second stringers 52 are bisected by the transverse rib 56. Preferably, the stringers 52 are symmetric on either side of the rib 56.

Stringers 52 each include a web 58 having a web height $W_h$ and a distal end 60. Each distal end 60 includes a tapered distal edge 62 that is preferably straight or linear along all or part of its length. The web height $W_h$ may be the same height along the entire length of the stringer 52 up to the tapered distal edge 62 upon where the web height $W_h$ begins to decrease due to the tapered distal edge 62. The tapered distal edge 62 of each stringer 52 is preferably straight or linear along all or most of its length. The web 58 of each stringer 52 is tapered by the tapered distal edge 62 to facilitate the load transfer from the stringers 52 to the skin 54 by providing a gradual increase in transverse bending and axial stiffness and relieving local stress concentrations.

In one or more configurations, each stringer 52 further includes a runout 66 defined by at least the tapered distal edge 62 of the corresponding distal end 60 and by the raised area 70 to increase the thickness of the skin 54 extending longitudinally and laterally beyond the distal end 60 of the stringer 52. The raised area 70 may be referred to as a pad-up area that redistributes the stresses. The tapered distal edge 62 continues into the raised area 70 of each runout 66 as the web height $W_h$ decreases. The tapered distal edge 62 of the web 58 transitions from being straight, into the raised area 70, and then from the raised area 70 with a curved or arch portion in a convex manner into transverse raised portion 74 of the skin 54.

Each side of a raised area 70, relative the tapered distal edge, includes a plurality of compound or tapered surfaces 78 adjacent to and transitioning into one another for defining a gradient of complex geometry, wherein each of the tapered surfaces 78 is oriented and configured to act as upwardly and downwardly inclined ramps, to collectively guide the distribution of water from one side of the stringer 52, up and over the raised area 70 (or over and down the raised area 70 depending on which side of the stringer 52 the water drains from), to the other side of the stringer 52. The tapered surfaces 78 may also be referred to as lands. Each side of each raised area 70 may include more or less than the number of tapered surfaces shown in FIG. 2.

As shown in FIG. 2, one or more embodiments of one side of each raised area 70 includes adjacent tapered surfaces 78$a$, 78$b$, 78$c$, 78$d$, 78$e$, and 78$f$ (which may be hereinafter referred to individually or collectively as tapered surfaces 78) wherein each of the tapered surfaces 78$a$, 78$b$, 78$c$, 78$d$, 78$e$, and 78$f$ is preferably created from multiple cutting tool passes and different tool paths of the milling machine. The other side of the raised area 70 is defined by tapered surfaces 78 that preferably correspond in shape, size and orientation with the tapered surfaces 78$a$, 78$b$, 78$c$, 78$d$, 78$e$, and a portion of 78$f$. The raised area 70 is symmetric about a longitudinal axis corresponding with the stringer 52. Tapered surface 78$f$ is centrally located on the raised area 70 such that half of the tapered surface 78$f$ is on one side of the stringer 52 and the other half of the tapered surface 78$f$ is on the other side of the stringer 52. Also, tapered surface 78 is preferably flat with constant thickness and the tapered surface 78$f$ is curved in cross section relative the longitudinal axis corresponding with the stringer 52. The minimum thickness of tapered surface 78$f$ is the same as the constant thickness of the surface 78$a$. The greatest thickness of the raised area 70 is at the tapered surface 78$f$ which is preferably flat in a transverse manner relative to the stinger 52. Therefore, the tapered surface 78$f$ forms the highpoint or apex of the raised area 70. For example, one path for water to drain cross the raised area 70 from one side to the other may begin at the radius curvature 82, up to tapered surface 78$a$, onto tapered surface 78$f$ and then down the other side of the raised area 70. In one or more embodiments, the tapered surfaces 78$b$, 78$c$ and 78$f$ are integral with the transverse raised portion 74 of the skin 54 and the tapered surface 78$e$ is integral with the web 58. In one or more configurations, one or more of the tapered surfaces 78 and/or the tapered distal end 62 are curved.

The raised area 70 with the plurality of tapered surfaces 78 and the tapered distal end 62 are preferably formed with a milling machine, based on parameters input into the milling machine, according to geometry and load requirements of the structural component. Each stringer 52 with runout 66 and raised area 70 defines an opening for water drainage larger than that defined by the constant radius of segment 30 of the U-shaped cutout 14 of FIG. 1 because the size of the U-shaped cutout 14 is limited by the radius of a single pass of the ball-end cutter of the milling machine.

Each raised area 70, with the use of the tapered surfaces 78, defines an opening for water drainage larger than can be created by a single pass of the ball-end cutter while also reducing the load stresses at the ends of the stringers 52 by distributing the stresses evenly into the skin 54.

Each raised area 70 fans out from the distal end of the stringer 52. Opposite sides of the raised area 70 of each stringer 52 are each defined by an inverse taper 80 that is preferably straight or linear along all or part of its length until in proximity of the transverse raised portions 74 of the skin 54. The raised areas 70 of the stringers 52 widen substantially perpendicular to the height of the webs 58 as the webs 58 taper into the raised areas 70 and also as the raised areas 70 extend beyond the distal ends 60 of the stringers 52 into the transverse raised portions 74. Each raised area 70 of the each stringers 52 continues into opposite sides of the transverse raised portion 74 such that that the raised areas 70 are integral with the transverse raised portion 74. The raised area 70 of each stringer 52 continues into the transverse raised portion 74 at the widest width of each raised area 70 so that rib 56, along with the transverse raised portions 74 of the skin 54, carry a portion of the loads previously carried by the stringers 52.

In one or more configurations, the web height $W_h$ of each web 58 is smallest when the raised area 70 is widest and the tapered distal edge 62 of the web 58 begins at a point which substantially corresponds with the beginning of the inverse taper 80 on the opposite sides of the raised area 70. The inverse taper 80 on each of the opposite sides of each raised area 70 correspond with one another such that the degree of inverse taper on each side of the raised area 70 is approximately the same.

One or more configurations include a stringer assembly of first and second stringers 52 wherein a width of each of the raised areas 70 beyond the tapered distal edge 62 of the webs 58 of the first and second stringers 52 corresponds with the web height $W_h$ of each of the webs 58 of the first and second stringers 52. One or more other configurations include a stringer assembly of first and second stringers 52 wherein a width of each of the raised areas 70 beyond the tapered distal edge 62 of the webs 58 of the first and second stringers 52 is substantially equal to the web height $W_h$ of each of the webs 58 of the first and second stringers 52. One or more other configurations include first and second stringers 52 wherein a width of each of the raised areas 70 beyond the tapered distal edge 62 of the webs 58 of the first and second stringers 52 is greater than the web height $W_h$ of each of the webs 58 of the first and second stringers 52.

The stringer 52 and the skin 54 with transverse raised portions 74 are preferably milled by a single pass of a ball-end cutter so that the radius of the ball-end cutter defines a radius curvature 82 between the web 58 of the stringer 52 and the skin 54. Radius curvatures 82 preferably extend along both sides of the entire length of each of the stringers 52, including the runouts 66, and along both sides of each of the transverse raised portions 74. A single continuous radius curvature 82 preferably extends substantially along one side of the web 58 of one of the stringers 52, along one side of raised area 70, defining one side of the inverse taper 80, and along one side of a portion of the transverse raised portion 74 of the skin 54. As best shown in FIG. 2, a portion of a radius curvature 82 forms part of a raised area 70 along with the plurality of tapered surfaces 78.

Figure 3:
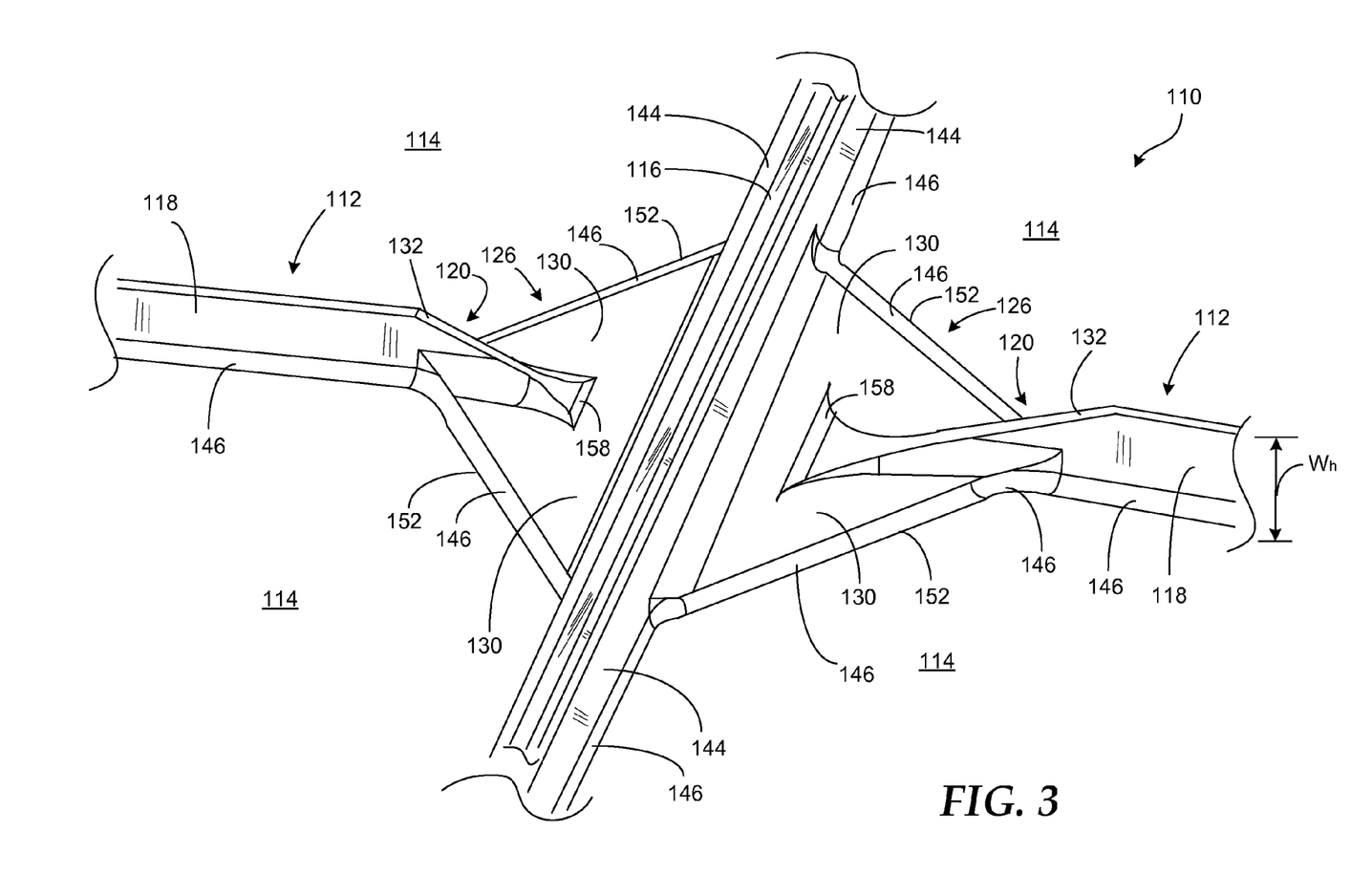
FIG. 3 illustrates a perspective view of another configuration of integrated skin and stringers with tapered ends bisected by a continuous transverse rib in a Pi bonded structure wherein each of the tapered ends include a raised area and the distal end of each of the stringers tapers into the corresponding raised area, which is used in association with at least one embodiment disclosed herein.
Figure 4:
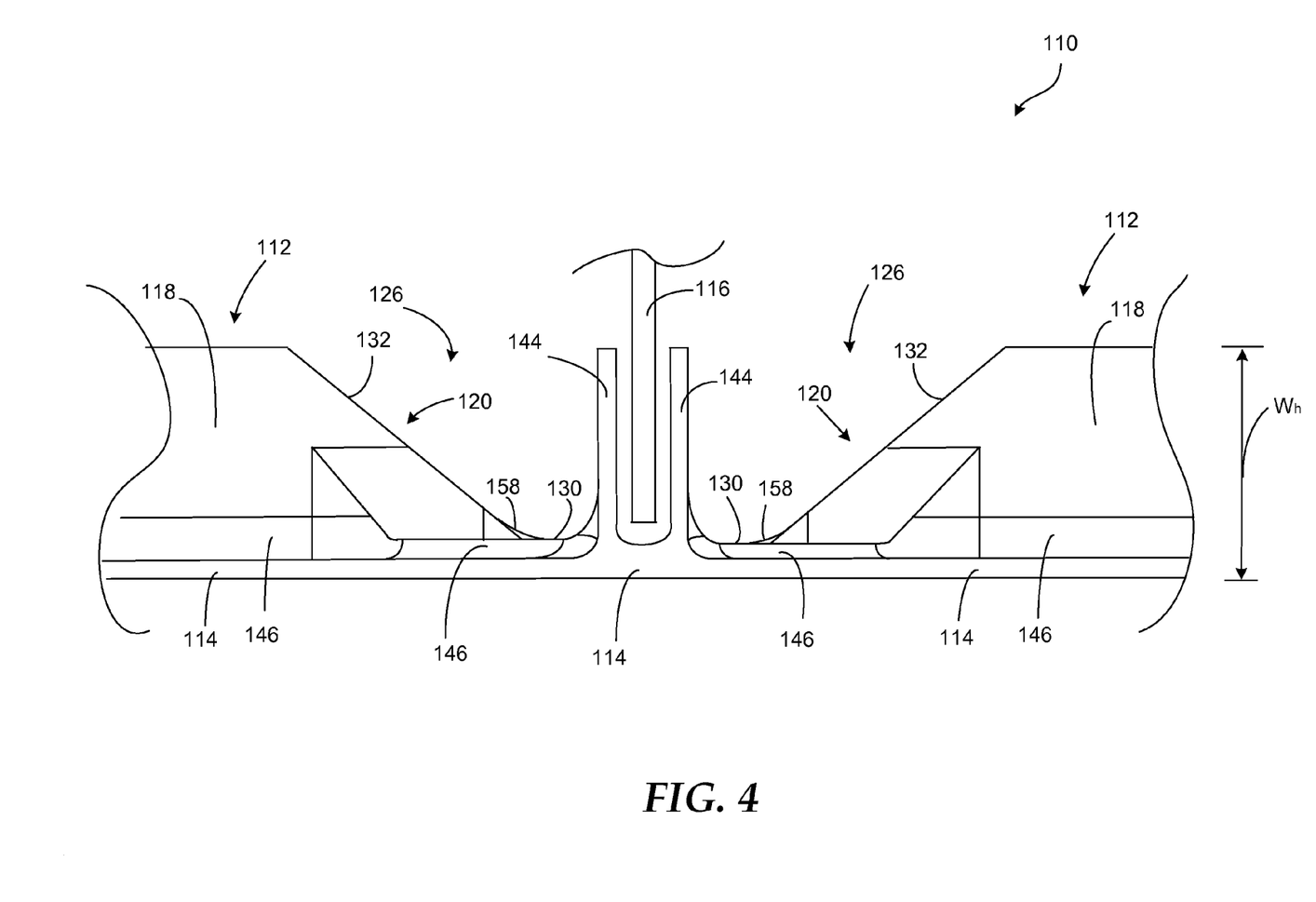
FIG. 4 illustrates an end view of the configuration of an integrated skin and stringers with the continuous transverse rib of the Pi bonded structure of FIG. 3, which is used in association with at least one embodiment disclosed herein.

FIG. 3 illustrates a perspective view of an alternative Pi bonded structure 110 of an integrally machined skin 114 with discontinuous first and second stringers 112 having tapered ends bisected by a transverse rib 116. The stringers 112 are substantially longitudinally aligned end-to-end with one another and integral with the skin 114. FIG. 4 illustrates an end view of the configuration of an integrated skin 114 and stringers 112 with the continuous transverse rib 116 of the Pi bonded structure 110 of FIG. 3. The Pi bonded structure 110 is similar to Pi bonded structure 50 except for the runouts 66, 126 with raised areas 70, 130 are different.

Stringers 112 each include a web 118 having a web height $W_h$ and a distal end 120. Each distal end 120 includes a tapered distal edge 122 that is preferably straight or linear along all or part of its length. The web height $W_h$ may be the same height along the entire length of the stringer 112 up to the tapered distal edge 132 upon where the web height $W_h$ begins to decrease due to the tapered distal edge 132. The tapered distal edge 132 of each stringer 112 is preferably straight or linear along all or most of its length.

In one or more configurations, each stringer 112 further includes the runout 126 defined by at least the tapered distal edge 132 of the corresponding distal end 120 and by a raised area 130 to increase the thickness of the skin 114 extending longitudinally and laterally beyond the distal end 120 of the stringer 112. The tapered distal edge 132 continues into or transitions into the raised area 130 of each runout 126 as the web height $W_h$ decreases. The tapered distal edge 132 of the web 118 tapers away into and terminates at the raised area 130. The tapered distal edge 132 may have a curved portion 158 such that the lower end of the tapered distal edge 132 is radiused to become tangent with the raised area 130.

The stringer 112 and the skin 114 with transverse raised portions 144 are preferably milled by a single pass of a ball-end cutter so that the radius of the ball-end cutter defines a radius curvature (fillet) 146 between the web 118 of the stringer 112 and the skin 114. Radius curvatures 146 preferably extend along both sides of the entire length of each of the stringers 112, including the runouts 126, and along both sides of each of the transverse raised portions 144. A single continuous radius curvature 146 preferably extends substantially along one side of the web 118 of one of the stringers 112, along one side of raised area 130 defining one side of the inverse taper 152, and along one side of a portion of the transverse raised portion 144 of the skin 114. As best shown in FIG. 3, a portion of a radius curvature 146 forms part of the raised area 130. As best shown in FIG. 4, each raised area 130 above the radius curvature 146 is otherwise preferably flat between each inverse taper 152 and also between the curved portion 158, or otherwise the end of the tapered distal edge 132, and the transverse raised portion 144 in order to provide the opening for water drainage between the distal end 120 of the stringer 112 and the transverse raised portion 144 of the skin 114.

One or more configurations include a stringer assembly of first and second stringers 112 wherein a width of each of the raised areas 130 beyond the tapered distal edge 132 of the webs 118 of the first and second stringers 112 corresponds with the web height $W_h$ of each of the webs 118 of the first and second stringers 112. One or more other configurations include a stringer assembly of first and second stringers 112 wherein a width of each of the raised areas 130 beyond the tapered distal edge 132 of the webs 118 of the first and second stringers 112 is substantially equal to the web height $W_h$ of each of the webs 118 of the first and second stringers 112. One or more other configurations include first and second stringers 112 wherein a width of each of the raised areas 130 beyond the tapered distal edge 132 of the webs 118 of the first and second stringers 112 is greater than the web height $W_h$ of each of the webs 118 of the first and second stringers 112.

Figure 5:
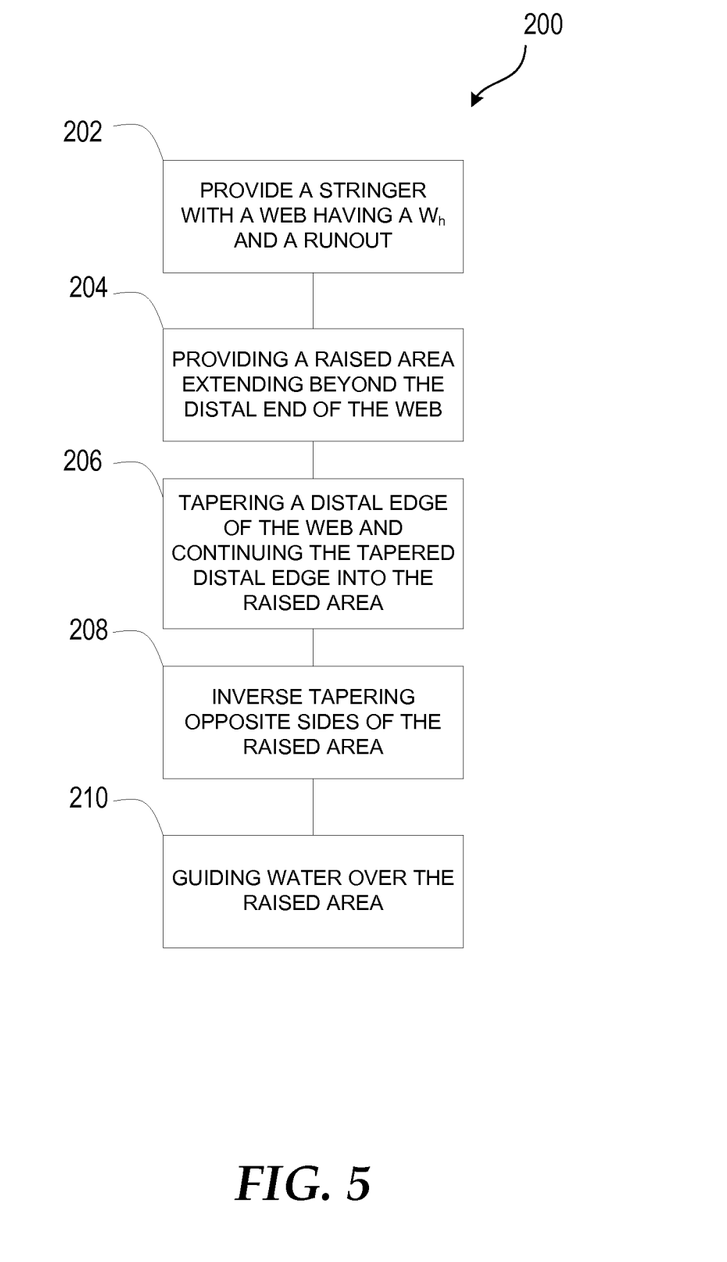
FIG. 5 illustrates one configuration of a method for reducing stress loads and controlling the drainage of water around a stringer is provided according to at least one embodiment disclosed herein.

FIG. 5 illustrates a method 200 for reducing stress loads and controlling the drainage of water around a stringer 52, 112. Unless otherwise indicated, more or fewer operations may be performed than shown in the figures and described herein. Additionally, unless otherwise indicated, these operations may also be performed in a different order than those described herein.

The method 200 starts at operation 202 where a stringer 52, 112 is provided that includes a web 58, 118 having a web height $W_h$ and a runout 66, 126 at a distal end of the web 58, 118. At operation 204, the method 200 provides a raised area 70, 130 extending beyond the distal end of the web 58, 118 to widen the runouts 66, 126 for stress reduction, and at operation 206, the method 200 includes tapering a distal edge 62, 132 of the web 58, 118 and continuing the tapered distal edge 62, 132 into the raised area 70, 130 as the web height $W_h$ decreases. At operation 208, the method 200 includes inverse tapering opposite sides of the raised area 70, 130 such that the raised area 70, 130 widens substantially perpendicularly to the web 58, 118 as the tapered distal edge 62, 132 continues into the raised area 70, 130 and as the raised area 70, 130 extends beyond the distal end of the web 58, 118. At operation 210, the method 200 includes guiding water over the raised area 70, 130 of the stringer 52, 112. The method 200 where providing the raised area 70, 130, to widen the runouts 66, 126 for stress reductions may also include a plurality of tapered surfaces 78 adjacent to one another and orienting the tapered surfaces 78 as ramps to collectively guide the water over the raised area 130.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A first stringer comprising a web having a web height and a runout at a distal end of the web, the runout defined at least by a raised area extending longitudinally and laterally beyond the distal end of the web and a tapered distal edge of the web continuing into the raised area as the web height decreases, wherein opposite sides of the raised area each include an inverse taper such that the raised area widens substantially perpendicular to the web as the web tapers into the raised area and as the raised area extends beyond the distal end of the web, wherein the raised area comprises a plurality of tapered surfaces adjacent to one another oriented and configured as ramps to collectively guide water over the raised area.

2. The first stringer of claim 1, wherein the raised area further comprises a radius curvature between the web of the stringer and a skin wherein the radius curvatures extends along a length of the stringer and along a transverse raised portion of a skin bonded to a rib.

3. The first stringer of claim 1, wherein the tapered distal edge of the web terminates into the raised area.

4. The first stringer of claim 1, wherein the tapered distal edge of the web continues into a transverse raised portion of a skin.

5. The first stringer of claim 1, wherein the inverse taper of the opposite sides of the raised area is straight.

6. The first stringer of claim 1, wherein the tapered distal edge of the web begins at a point substantially corresponding with the inverse taper beginning on the opposite sides of the raised area.

7. The first stringer of claim 1, wherein the web height is smallest where the raised area is widest.

8. The first stringer of claim 1, wherein the first stringer is substantially longitudinally aligned with a second stringer and the first and second stringers are bisected by a transverse rib, and wherein the raised area of the first stringer and a raised area of the second stringer continue into transverse raised portions of a skin bonded to the rib, and the raised areas of the first and second stringers are widest where the raised areas of the first and second stringers continue into the rib.

9. The first stringer of claim 1, wherein a skin, the web and the raised area of the first stringer, and transverse raised portions of the skin, are integrally formed from a single workpiece.

* * * * *